(12) United States Patent
Miyano

(10) Patent No.: US 7,262,921 B2
(45) Date of Patent: Aug. 28, 2007

(54) ILLUMINATING OPTICAL SYSTEM FOR ENDOSCOPE

(75) Inventor: Hitoshi Miyano, Saitama (JP)

(73) Assignee: Fujinon Corporation, Saitama-Shi, Saitama (JP)

( * ) Notice: Subject to any disclaimer, the term of this patent is extended or adjusted under 35 U.S.C. 154(b) by 0 days.

(21) Appl. No.: 11/362,060

(22) Filed: Feb. 27, 2006

(65) Prior Publication Data
US 2006/0193057 A1   Aug. 31, 2006

(30) Foreign Application Priority Data
Feb. 28, 2005 (JP) .................... P. 2005-054645

(51) Int. Cl.
*G02B 3/00* (2006.01)
*A61B 1/06* (2006.01)
(52) U.S. Cl. ...................... 359/652; 600/160
(58) Field of Classification Search ........... 600/101, 600/160, 162–163, 167–168, 176, 178; 356/479; 359/252–254, 652–654
See application file for complete search history.

(56) References Cited

U.S. PATENT DOCUMENTS

| 5,093,719 | A | * | 3/1992 | Prescott ..................... 348/65 |
| 5,298,741 | A | * | 3/1994 | Walt et al. ............. 250/227.23 |
| 5,396,366 | A | * | 3/1995 | Brown et al. ............. 359/435 |
| 5,978,146 | A | * | 11/1999 | Kittaka et al. ............ 359/652 |
| 6,776,537 | B2 | * | 8/2004 | Toyama ..................... 385/93 |
| 6,785,441 | B2 | * | 8/2004 | Ooyama et al. ............. 385/34 |
| 6,919,953 | B2 | * | 7/2005 | Kittaka et al. ............ 356/124 |
| 2004/0233542 | A1 | * | 11/2004 | Yamaguchi et al. ........ 359/642 |
| 2006/0193579 | A1 | * | 8/2006 | McLeod et al. ............ 385/120 |

FOREIGN PATENT DOCUMENTS

JP         10-54945 A       2/1998

OTHER PUBLICATIONS

Sato. "Basic Study on Imaging Interferometer using Long Gradient-Index Lenses for Optical Coherence Tomography." Optical Review. The Optical Society of Japan. vol. 10, No. 5. 2003 pp. 452-455.*

* cited by examiner

*Primary Examiner*—Scott J. Sugarman
*Assistant Examiner*—DaWayne A. Pinkney
(74) *Attorney, Agent, or Firm*—Birch, Stewart, Kolasch & Birch, LLP

(57) ABSTRACT

An endoscope illuminating optical system having a gradient index lens capable of illuminating by a sufficient light amount and by a wider angle is provided. The endoscope illuminating optical system is constituted to illuminate an observed region by light guided by a light guide 1, by way of a gradient index lens 2, and the gradient index lens 2 satisfies Condition Equations (2) and (3) below:

$$(AR)^2 \leq 0.6 \quad (2)$$

$$0.5k+0.35 \leq AL/\pi \leq 0.5k+0.65 \quad (3)$$

where, R designates an effective radius of the gradient index lens, L designates a length in an optical axis X direction of the gradient index lens, A designates a constant coefficient, k designates a nonnegative integer.

16 Claims, 9 Drawing Sheets

REFRACTIVE INDEX DISTRIBUTION n(r) (N₀=1.8)

CHANGE IN CENTER LIGHT AMOUNT
BY LIGHT L ($N_0=1.8$, $A=0.5$)

EXAMPLE 4 ($N_0=1.5$, $L=2.5$)

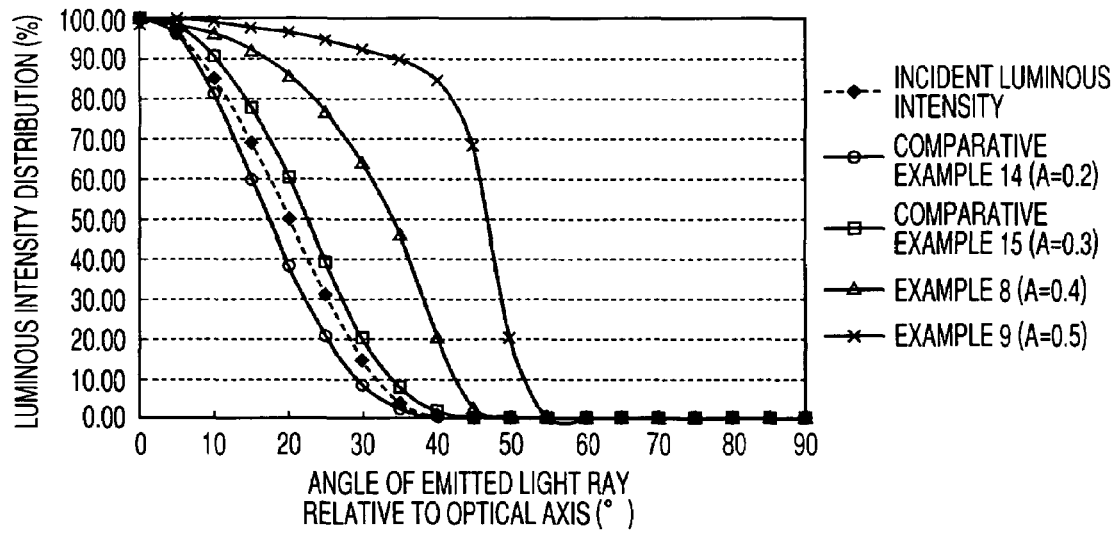
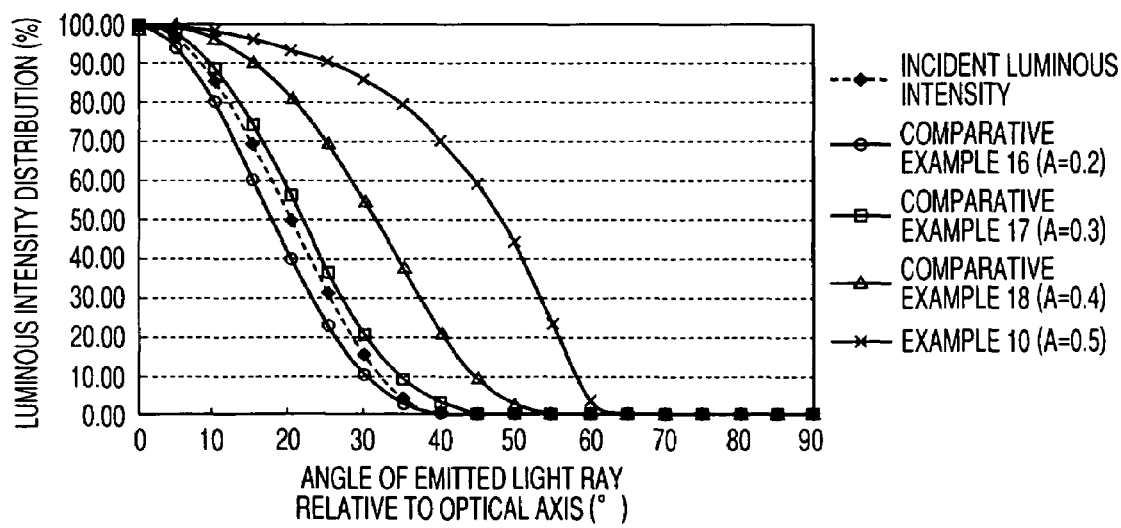

ILLUMINATING OPTICAL SYSTEM FOR ENDOSCOPE

FIELD OF THE INVENTION

The present invention relates to an illuminating optical system mounted to an endoscope apparatus for illuminating an observed region, particularly to an illuminating optical system for an endoscope (hereinafter sometimes referred to as "endoscope illuminating optical system"), having a gradient index lens (GRIN lens) constituted such that a refractive index is increased as being proximate to a center portion from a peripheral portion in a radius direction.

BACKGROUND OF THE INVENTION

In a background art, according to an illuminating optical system mounted to an endoscope apparatus, there is frequently used a light guide constituted by an optical fiber in which a refractive index of a core is constant regardless of a portion thereof, however, a light guide of this type poses a problem that a luminous intensity distribution characteristic thereof cannot be adapted to an endoscope having a wide angle object lens, that is, an intensity of a light ray emitted to a peripheral portion having a large angle from an optical axis is more attenuated than an intensity of a light ray emitted to a center portion.

For example, FIG. 3 shows a luminous intensity distribution (indicating rates of light rays emitted by respective angles relative to an optical axis by constituting a reference (100%) of an intensity of an emitted light ray in parallel with the optical axis) of a light guide in which a refractive index of a core is 1.62, a refractive index of a clad is 1.48 and a numerical aperture NA is about 0.66. When the numerical aperture NA is converted into the angle from the optical axis, the angle becomes about 41.2 degree, as shown by FIG. 3, an emitted light ray having a large angle from the optical axis is more attenuated than a light ray having a small angle for the reasons, for example, a long distance of passing inside of the optical fiber, and even when the angle from the optical axis is at a vicinity of 20 degrees, the luminous intensity is reduced to be halved.

The object lens used in an endoscope is frequently provided with a wide angle in which an angle of view (viewing angle) exceeds 100 degrees (semi angle of view is 50 degrees), in a case of illumination by the above-described luminous intensity distribution, an image at a peripheral field of view region becomes dark and therefore, it is difficult to carry out sufficient observation. Further, although there is also known an illuminating optical system widening an illuminating angle by arranging a concave lens at a front end portion of a light guide, only a light amount at a peripheral portion which is inherently liable to be insufficient is scattered and it is not improved that the light amount of the peripheral portion is smaller than that of a center portion thereof.

On the other hand, there is proposed an endoscope illuminating optical system having a wider angle having a refractive indexes distribution type lens in which a refractive index is increased as being proximate to a center portion from a peripheral portion (refer to JP-A-10-54945).

SUMMARY OF THE INVENTION

An object of an illustrative, non-limiting embodiment of the invention is to provide an endoscope illuminating optical system having a gradient index lens capable of illuminating by a sufficient light amount and by a wider angle.

The inventor(s) found that by simply using the gradient index lens, a luminous intensity distribution suitable for an endoscope cannot be achieved such that although a wide range can be illuminated, a light amount at a peripheral portion cannot sufficiently be achieved and in order to achieve a preferable luminous intensity distribution, it is necessary to pertinently set a refractive index distribution, a length in an optical axis direction and the like of the gradient index lens.

According to an illustrative, non-limiting embodiment of an endoscope illuminating optical system of the invention, a refracting index distribution of a gradient index lens, a length in a direction of an optical axis and the like are set to pertinent ranges.

That is, an exemplary endoscope illuminating optical system according to the invention is characterized in an endoscope illuminating optical system including: a light guide; and a gradient index lens having a refractive index distribution n(r) approximately expressed by Condition Equation (1), wherein the gradient index lens illuminates an observed region by light guided by the light guide, and wherein the gradient index lens satisfies Condition Equations (2) and (3):

$$n(r)=N_0(1-(A^2 r^2/2)) \quad (1)$$

$$(AR)^2 \leq 0.6 \quad (2)$$

$$0.5k+0.35 \leq AL/\pi \leq 0.5k+0.65 \quad (3)$$

wherein $N_0$ designates a refractive index on an optical axis of the gradient index lens; r designates a distance from the optical axis along a radial direction of the gradient index lens; R designates an effective radius of the gradient index lens; L designates a length of the gradient index lens in a direction of the optical axis; A designates a constant coefficient; and k designates a nonnegative integer.

Further, all of units of r, R, L stay the same (for example, when a unit of r is mm, also units of R, L is mm), a unit of A is an inverse of the unit of r, R, L (for example, when the units of r, R, L are mm, the unit of A is $mm^{-1}$).

According to an endoscope illuminating optical system of the invention, by constituting the gradient index lens to satisfy Condition Equations (2) and (3), a luminous intensity distribution suitable for an endoscope, that is, a luminous intensity distribution capable of illuminating by a sufficient light amount and by a wider angle can be provided.

Therefore, by mounting the system to the endoscope, it is easy to provide a bright image even at a peripheral portion of a field of view region and excellent observation, diagnosis can be carried out.

BRIEF DESCRIPTION OF DRAWINGS

FIG. 12 is a graph showing luminous intensity distributions of Examples 8, 9, Comparative Examples 14 through 15.

FIG. 13 is a graph showing luminous intensity distributions of Example 10, Comparative Examples 16 through 19.

Figure 1:
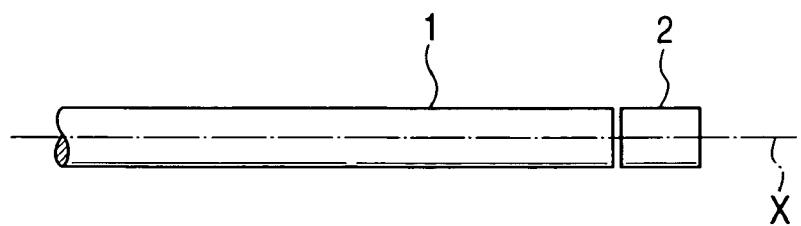
FIG. 1 is an outline view showing an endoscope illuminating optical system according to an illustrative, non-limiting embodiment of the invention.

Reference numerals and signs are set forth below.
1: light guide
2: gradient index lens
$2\pi/A$: radius of light ray incident on gradient index lens in parallel with optical axis
$\theta_{max}$: angle relative to optical axis of light ray emitted by widest angle
L: length (in optical axis direction of gradient index lens)
R: effective radius (of gradient index lens)
X: optical axis

DETAILED DESCRIPTION OF THE INVENTION

Figure 2:
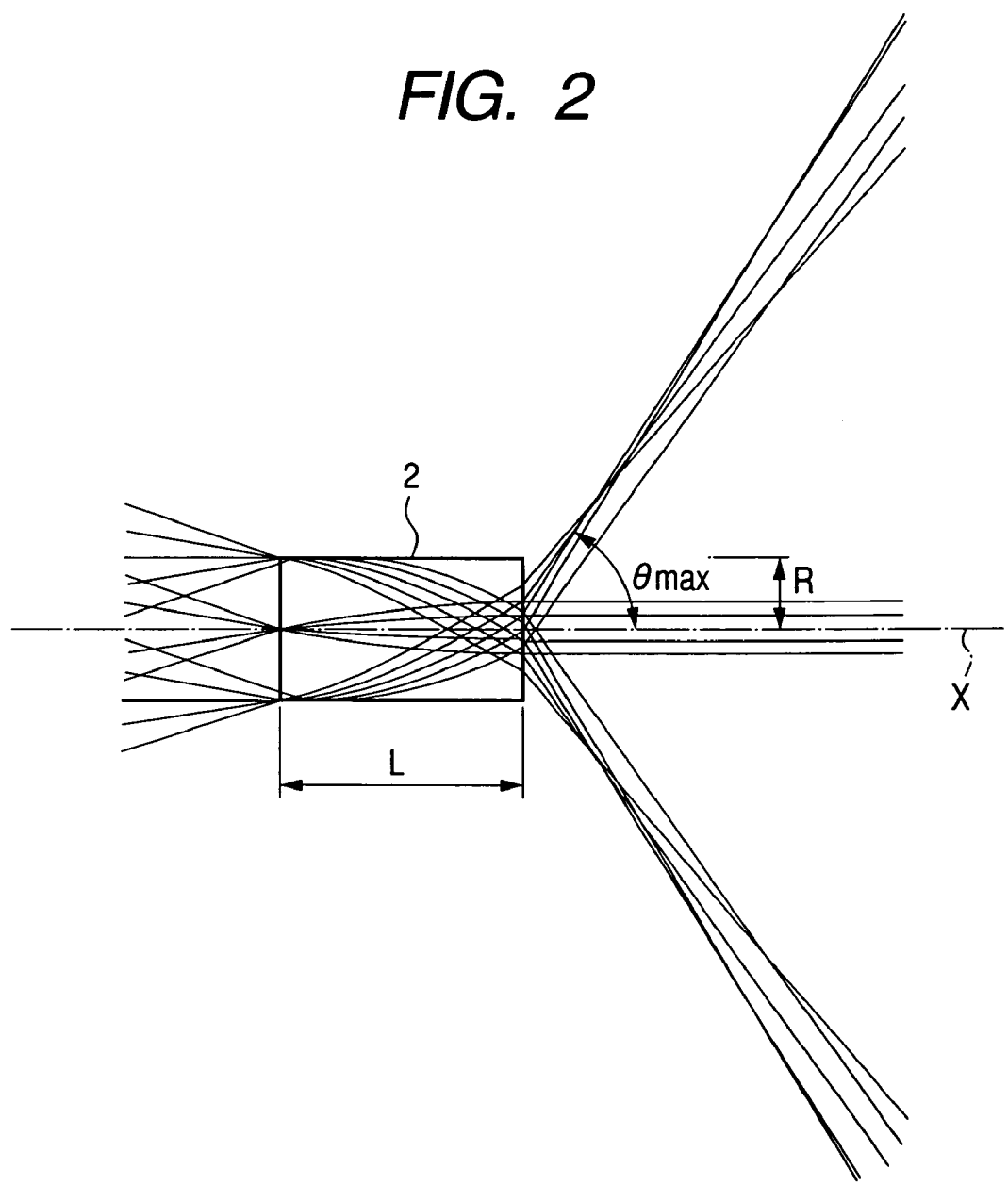
FIG. 2 is a view showing operation of a gradient index lens shown in FIG. 1.
Figure 3:
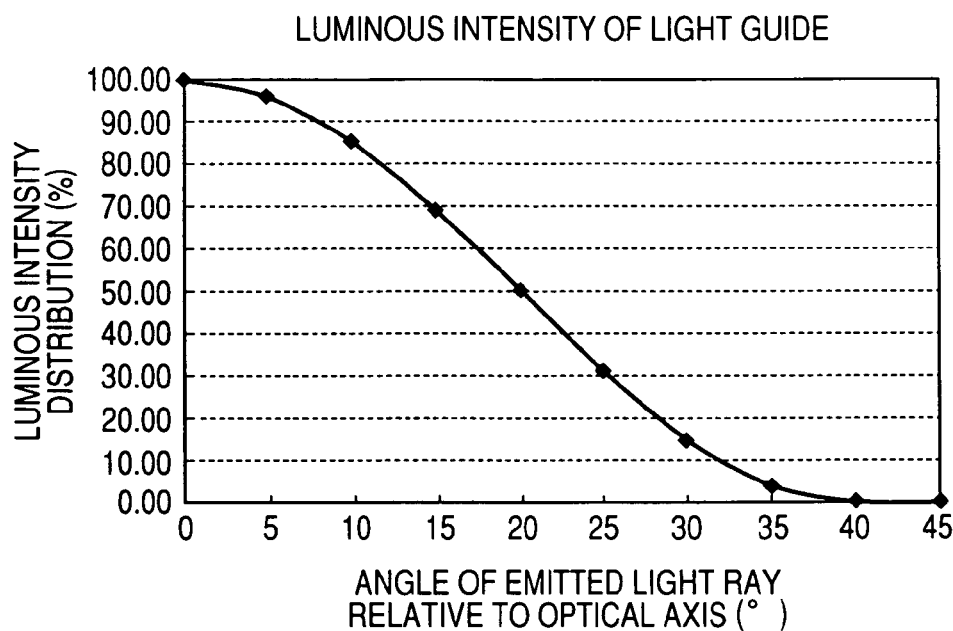
FIG. 3 is a graph showing an example of a luminous intensity distribution of a light guide shown in FIG. 1.

An exemplary embodiment of the invention will be explained in details in reference to the drawings as follows. FIG. 1 is a view showing an outline constitution of an endoscope illuminating optical system according to an illustrative, non-limiting embodiemnt embodiment of the invention, and FIG. 2 is a diagram showing operation of a gradient index lens 2 shown in FIG. 1. Further, FIG. 3 is a graph showing an example of a luminous intensity distribution of a light guide 1 shown in FIG. 1.

As shown by FIG. 1, the endoscope illuminating optical system of the embodiment is constituted by including the light guide 1 for guiding illuminating light and the gradient index lens 2 for illuminating an observed region by light guided by the light guide 1. The light guide 1 is constituted by bundling a so-to-speak stepped refractive index type optical fiber in which a refractive index of a core is formed to be constant regardless of a portion thereof, and a luminous intensity distribution thereof is as shown by FIG. 3, when, for example, a refractive index of a core of the optical fiber is 1.62, a refractive index of a clad is 1.48 and a numerical aperture NA is about 0.66.

On the other hand, the gradient index lens 2 is constituted such that a refractive index is increased as being proximate to a center portion from a peripheral portion, in detail, a refractive index distribution n (r) thereof is approximately expressed by Condition Equation (1) below.

$$n(r)=N_0(1-(A^2r^2/2)) \quad (1)$$

Here, $N_0$ designates a refractive index on an optical axis X, r designates a distance from the optical axis X along the radial direction, A designates a constant coefficient, respectively.

Figure 4:
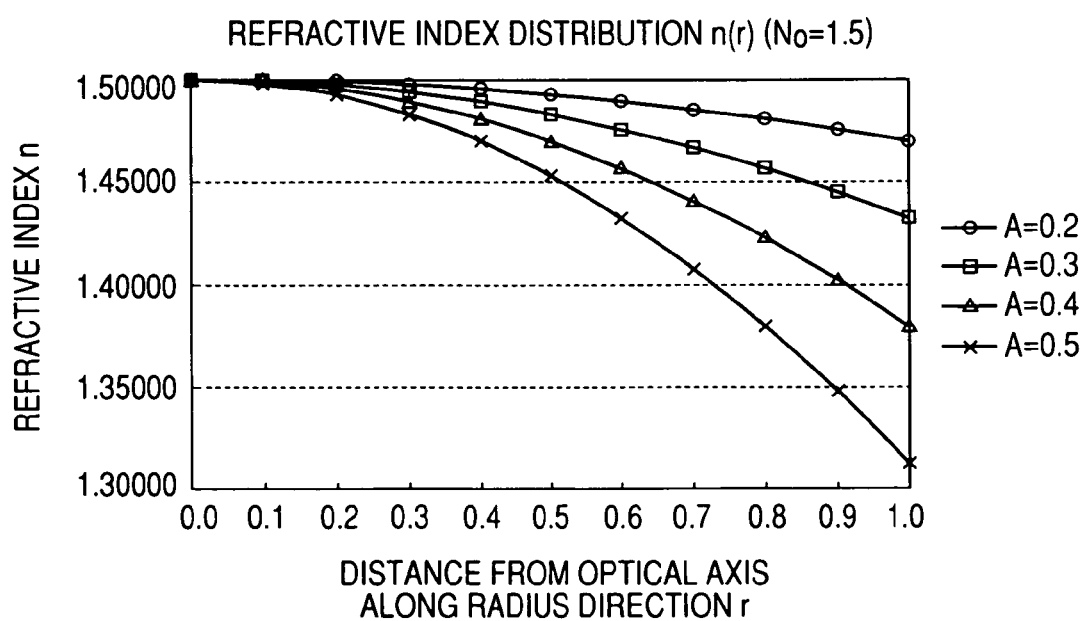
FIG. 4 is a graph showing a change in a refractive index distribution n (r) by a value of A ($N_0=1.5$).
Figure 5:
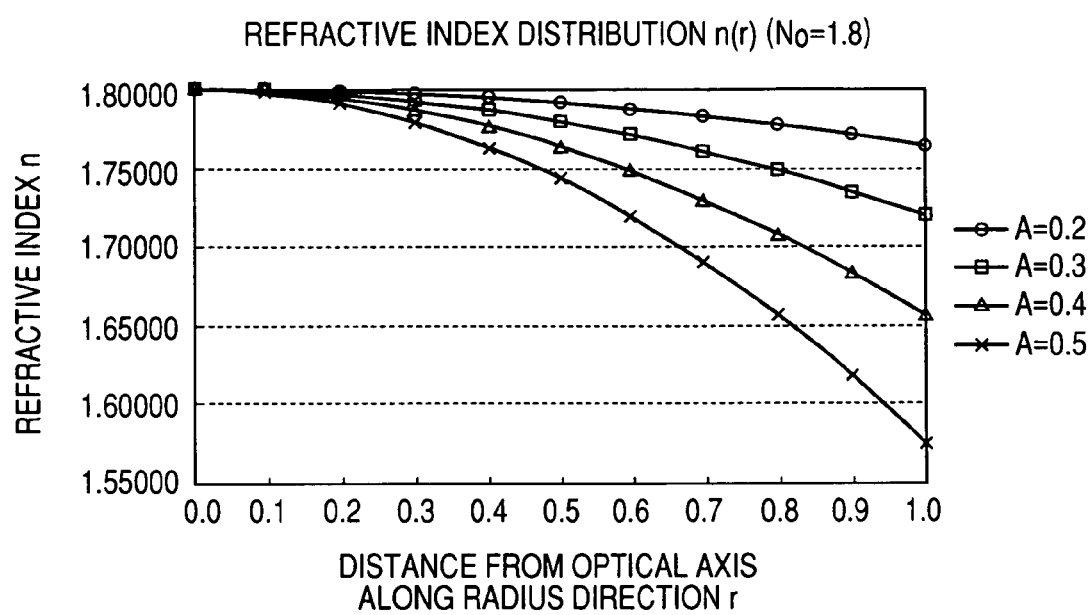
FIG. 5 is a graph showing a change in a refractive index distribution n (r) by the value of A ($N_0=1.8$).

FIG. 4 and FIG. 5 show refractive index distributions n (r) when a value of the constant coefficient A is changed as 0.1, 0.2, 0.3, 0.4, 0.5 in Condition Equation (1). Further, FIG. 4 shows a case in which the refractive index $N_0$ on the optical axis X is $N_0=1.5$ and FIG. 5 shows a case in which $N_0=1.8$.

Further, as shown by FIG. 2, the gradient index lens 2 is constituted to satisfy Condition Equations (2) and (3) below when a length of the lens 2 in a direction of the optical axis X is designated by L and an effective radius is designated by R.

$$(AR)^2 \leq 0.6 \quad (2)$$

$$0.5k+0.35 \leq AL/\pi \leq 0.5k+0.65 \quad (3)$$

Here, k designates a nonnegative integer.

According to the gradient index lens 2, light guided by the light guide 1 can illuminate an observed region by a wide angle (an angle $\theta_{max}$ (refer to FIG. 2) relative to the optical axis X of a light ray emitted by a widest angle is equal to or larger than 50 degrees) and also a luminous intensity distribution is preferable for the endoscope.

Figure 6:
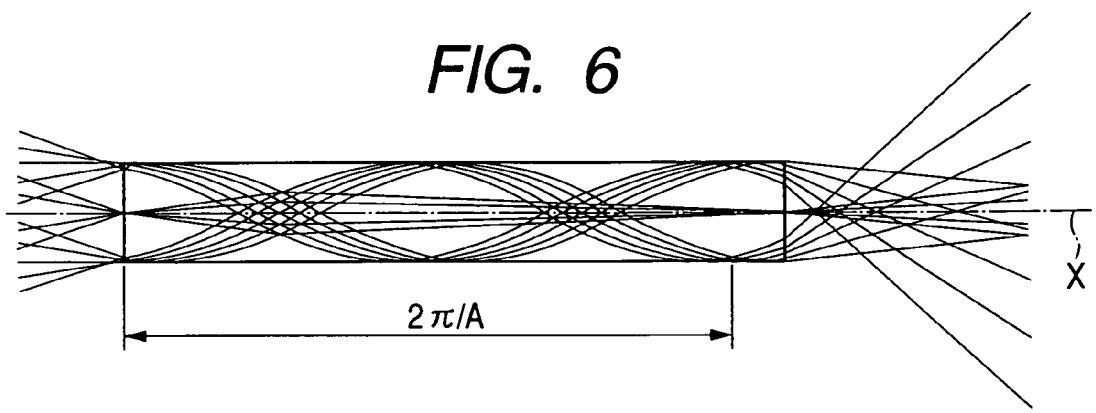
FIG. 6 is a view showing operation of a gradient index lens.

Further, as a gradient index lens in which a refractive index distribution approximately satisfies Condition Equation (1), for example, Selfoc (registered trade mark) made by Nippon Sheet Glass Co., Ltd. is known. According to a gradient index lens of this kind, as shown by FIG. 6, it is known that a light ray incident on the lens in parallel with the optical axis X is advanced to draw a cosine curve having a period of $2\pi/A$ (refer to Optical and Electro-Optical Engineering Contact, vol. 28, No. 8).

That is, a light ray incident on a peripheral portion of the gradient index lens in parallel with the optical axis X substantially crosses the optical axis X by ¼ period, passes a peripheral portion on an opposed side by ½ period and passes the original peripheral portion in parallel with the optical axis X after 1 period $(2\pi/A)$.

According to the gradient index lens 2 of the above-described embodiment, a length L thereof is set to a length proximate to an amount of ¼ period, mentioned above. Thereby, a high intensity light ray incident on the peripheral portion of the gradient index lens 2 substantially in parallel with the optical axis X can be emitted from the light guide 1 having the luminous intensity distribution as shown by FIG. 3 by providing a large angle relative to the optical axis X.

EXAMPLES

The endoscope illuminating optical system of the invention will be explained further specifically by showing examples as follows. The constitution of the endoscope illuminating optical system according to respective examples shown below is as shown by FIG. 1 and FIG. 2 and an explanation of a content described in the above-described explanation of the embodiment will be omitted in order to avoid duplication. Data of specific light intensity distributions are shown by graphs with regard to the respective examples as follows.

Examples 1, 2, 3

All of Examples 1 through 3 are provided with the gradient index lens 2 of the refractive index distribution n (r)

in which the constant coefficient A=0.5 (mm$^{-1}$), the refractive index $N_0$ on the optical axis X=1.8 in Condition Equation (1). Further, the length of L of the gradient index lens 2 is set to a length of 3/16 period of the cosine curve in Example 1, a length of 4/16 period thereof in Example 2 and a length of 5/16 thereof in Example 3, respectively. Further, the effective radius R of the gradient index lens 2 is set to 1.0 (mm) in all the examples.

All of the gradient index lens 2 of Examples 1 through 3 satisfies Condition Equation (2) and (3) (in correspondence with a case of k=0, which stays the same in Examples 3 through 15 as follows).

Example 1: $(AR)^2$=0.25, $AL/\pi$=0.375
Example 2: $(AR)^2$=0.25, $AL/\pi$=0.5
Example 3: $(AR)^2$=0.25, $AL/\pi$=0.625

Further, $AL/\pi$ is a value calculated by constituting a length of one period by $2\pi/A$. For example, in Example 1, L=(3/16)×($2\pi/A$) and therefore, $AL/\pi$=(3/16)×2.

Figure 7:
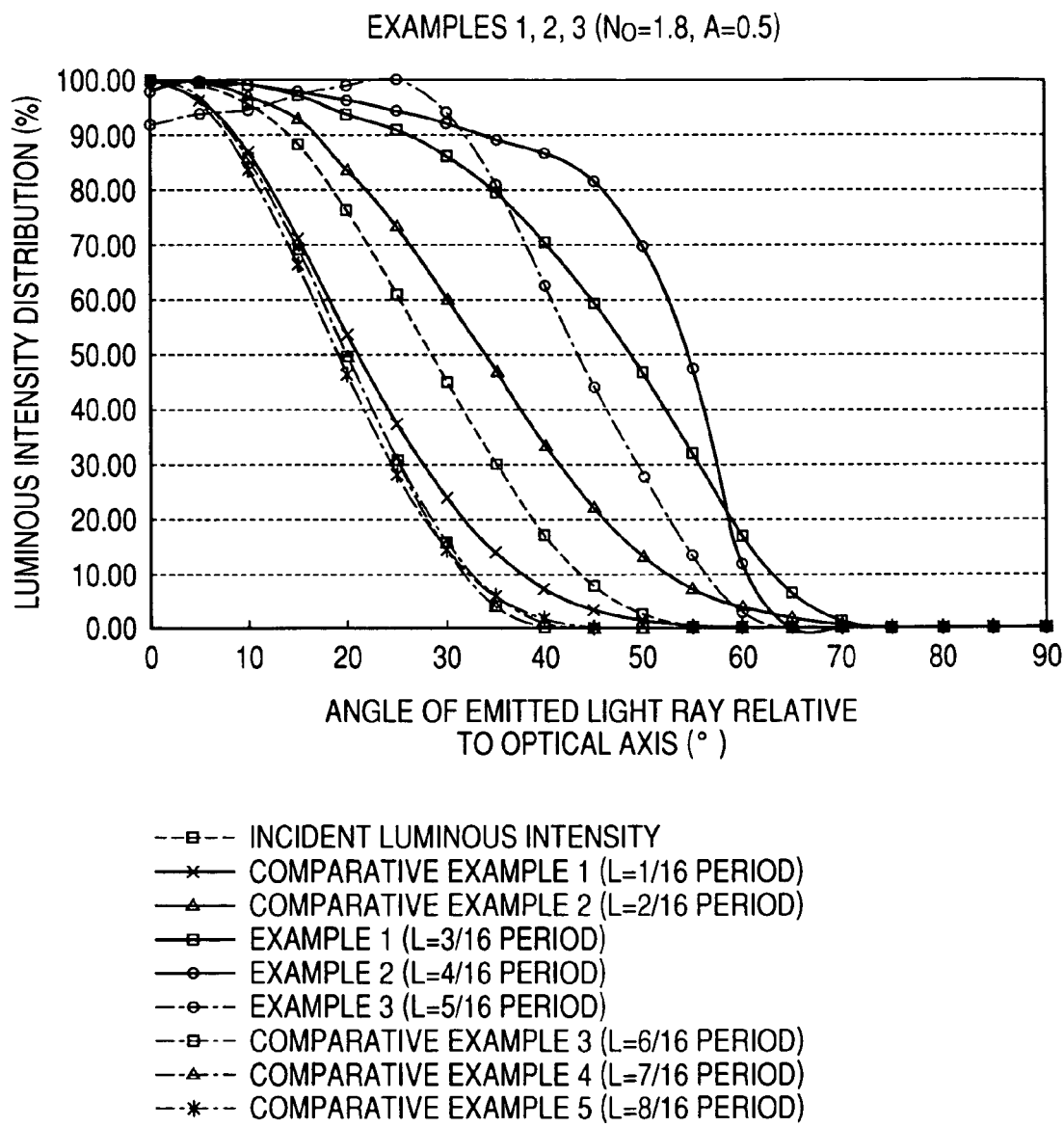
FIG. 7 is a graph showing luminous intensity distributions of Examples 1 through 3, Comparative Examples 1 though 5.

FIG. 7 also shows graphs of luminous intensity distributions of Comparative Examples 1 through 5 which do not satisfy Condition Equation (3) for comparison. As shown by FIG. 7, according to all of the graphs of Examples 1 through 3, even in a light ray having an emitting angle at a vicinity of 50 degrees, the intensity becomes equal to or larger than about 30% of a maximum intensity, according to all of the graphs of Comparative Examples 1 through 5, the intensity becomes equal to or smaller than 15%. Therefore, according to Examples 1 through 3, it is apparent that even the peripheral portion of the observed region can be illuminated brightly.

Further, as shown by FIG. 7, Example 2 is provided with the largest intensity of a light ray having an emitting angle at a vicinity of 50 degrees in Examples 1 through 3. On the other hand, Example 1 is excellent in a luminous intensity distribution of a light ray having an emitting angle exceeding 60 degrees. Therefrom, it seems that a luminous intensity distribution preferable for an endoscope is provided when $AL/\pi$ in Condition Equation (3) falls in a range less than 0.5, for example, a range equal to or larger than 0.35 and equal to or smaller than 0.9 or equal to or larger than 0.36 and equal to or smaller than 0.46.

Further, an upper limit value 0.65 and a lower limit value 0.35 of Condition Equation (3) are set to include respective values 0.625 and 0.375 of $AL/\pi$ of Examples 1, 3 centering on a value 0.5 of $AL/\pi$ of Example 2.

Figure 8:
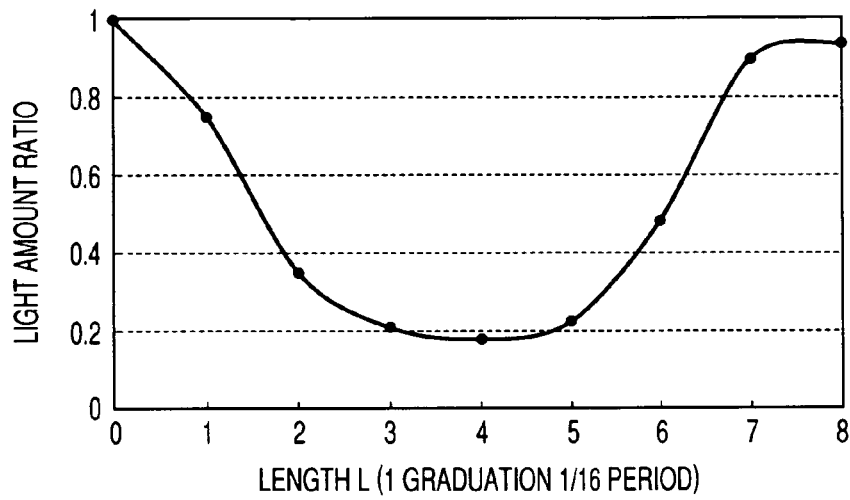
FIG. 8 is a graph showing a change in a light amount of a center portion of emitted light by a length L.

Further, FIG. 8 is a graph showing to what degree a light amount of a center portion of emitted light is changed in accordance with a change in the length L when $N_0$ is set to 1.8, A is set to 0.5 (mm$^{-1}$) (indicating a light amount ratio when a light amount of a center portion of incident light is set to 1). As shown by FIG. 8, it is apparent that in Examples 1 through 3, the light amount of the center portion of the emitted light becomes about 20% of the light amount of the center portion of incident light.

Example 4

Figure 9:
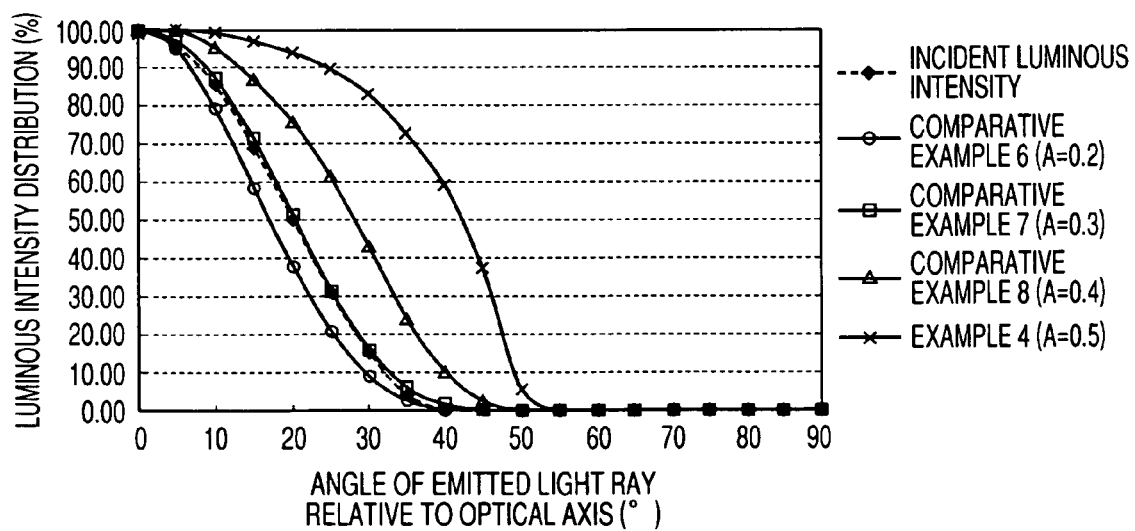
FIG. 9 is a graph showing luminous intensity distributions of Example 4, Comparative Examples 6 through 8.

FIG. 9 shows a graph of a luminous intensity distribution of Example 4.

Example 4 is provided with the gradient index lens 2 of the refractive index distribution n (r) in which the constant coefficient A=0.5 (mm$^{-1}$), the refractive index on the optical axis X is set to be $N_0$=1.5 in Condition Equation (1). Further, the length L is set to L=2.5 (mm) and the effective radius is set to R=1.0 (mm).

The gradient index lens 2 of Example 4 satisfies Condition Equations (2) and (3) as shown below. Further, calculation is carried out by setting $\pi$=3.14 (which stays the same in Examples 5 through 15).

Example 4: $(AR)^2$=0.25, $AL/\pi \approx$0.398

FIG. 9 also shows graphs of luminous intensity distributions of Comparative Examples 6 through 8 in which only the value of the constant coefficient A differs from that of Example 4 and which do not satisfy Condition Equation (3) for comparison. As shown by FIG. 9, according to Example 4, it is apparent that even the peripheral portion of the observed region can be illuminated more brightly than in Comparative Examples 6 through 8.

Examples 5, 6

Figure 10:
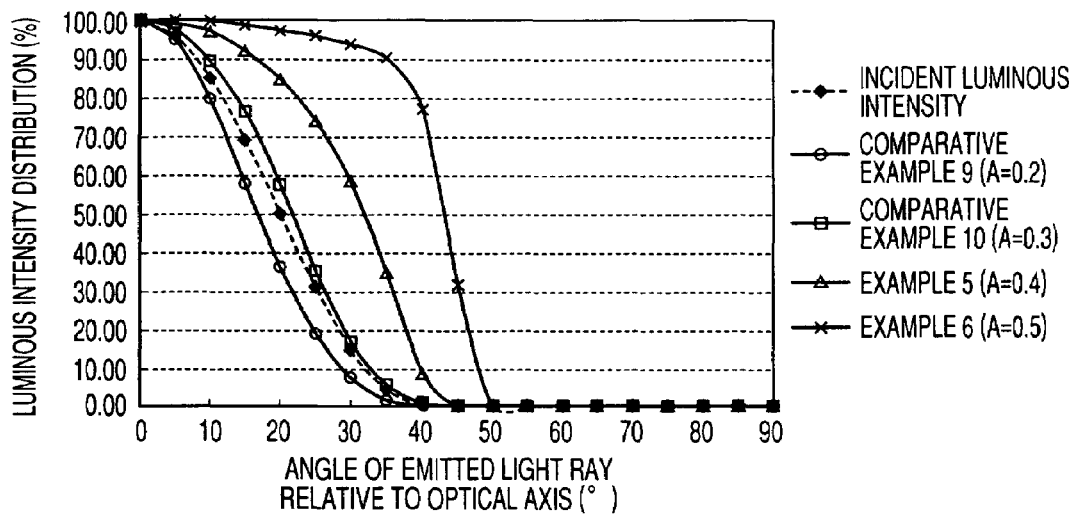
FIG. 10 is a graph showing luminous intensity distributions of Examples 5, 6, Comparative Examples 9 through 10.

FIG. 10 shows graphs of luminous intensity distributions of Examples 5, 6.

Example 5 is provided with the gradient index lens 2 of the refractive index distribution n (r) in which the constant coefficient is set to A=0.4 (mm$^{-1}$), the refractive index on the optical axis X is set to $N_0$=1.5 in Condition Equation (1). Further, the length is set to L=3.0 (mm), the effective radius is set to R=1.0 (mm).

Further, Example 6 is set to be the same as Example 5 except that the constant coefficient is set to A=0.5 (mm$^{-1}$) in Condition Equation (1).

Examples 5, 6 satisfy all of Condition Equations (2) and (3) as follows.

Example 5: $(AR)^2$=0.16, $AL/\pi \approx$0.382
Example 6: $(AR)^2$=0.25, $AL/\pi \approx$0.478

FIG. 10 also shows graphs of luminous intensity distributions of Comparative Examples 9, 10 in which only values of the constant coefficient A differ from those of Examples 5, 6 and which do not satisfy Condition Equation (3) for comparison. As shown by FIG. 10, it is apparent that according to Examples 5, 6, even the peripheral portion of the observed region can be illuminated more brightly than Comparative Examples 9, 10.

Example 7

Figure 11:
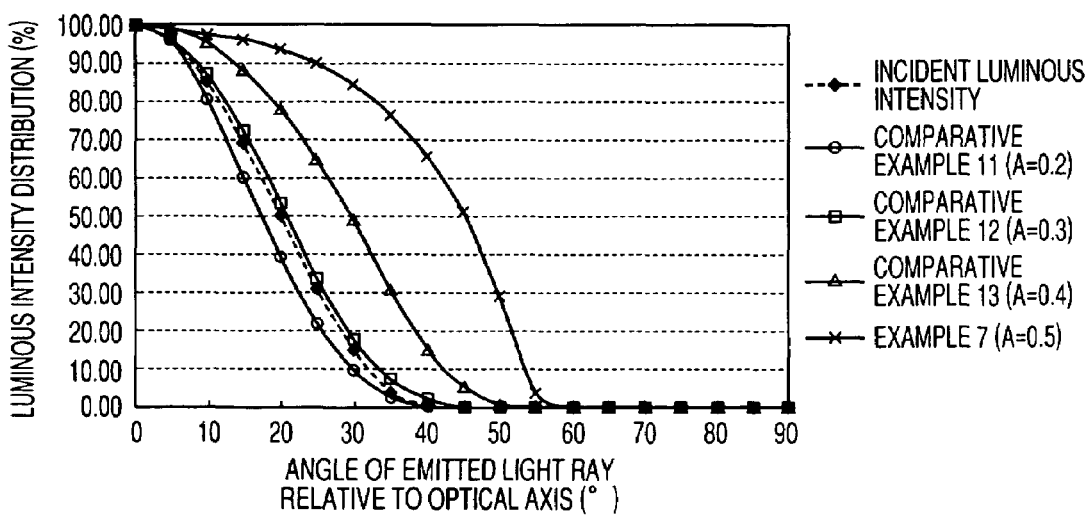
FIG. 11 is a graph showing luminous intensity distributions of Example 7, Comparative Examples 11 through 13.

FIG. 11 shows graph of a luminous intensity distribution of Example 7.

Example 7 is provided with the gradient index lens 2 of the refractive index distribution n (r) in which the constant coefficient is set to A=0.5 (mm$^{-1}$), the refractive index on the optical axis X is set to $N_0$=1.6 in Condition Equation (1). Further, the length is set to L=2.5 (mm), the effective radius is set to R=1.0 (mm).

Example 7 satisfies Condition Equations (2) and (3) as follows.

Example 7: $(AR)^2$=0.25, $AL/\pi \approx$0.398

FIG. 11 also shows graphs of luminous intensity distributions of Comparative Examples 11 through 13 in which only values of the constant coefficient A differ from that of Example 7 and which do not satisfy Condition Equation (3) for comparison. As shown by FIG. 11, it is apparent that according to Example 7 even the peripheral portion of the observed region can be illuminated more brightly than Comparative Examples 11 through 13.

Examples 8, 9

FIG. 12 shows graphs of luminous intensity distributions of Examples 8, 9.

Example 8 is provided with the gradient index lens 2 of the refractive index distribution n (r) in which the constant coefficient is set to A=0.4 (mm$^{-1}$), the refractive index on the optical axis X is set to $N_0$=1.6 in Condition Equation (1). Further, the length is set to L=3.0 (mm), the effective radius is set to R=1.0 (mm).

Further, Example 9 is set to be the same as Example 8 except that the constant coefficient is set to A=0.5 (mm$^{-1}$) in Condition Equation (1).

Examples 8, 9 satisfy all of Condition Equations (2) and (3) as follows.

Example 8: $(AR)^2$=0.16, AL/$\pi$≈0.382
Example 9: $(AR)^2$=0.25, AL/$\pi$≈0.478

FIG. 12 also shows graphs of luminous intensity distributions of Comparative Examples 14, 15 in which only values of the constant coefficient A differ from those of Examples 8, 9 and which do not satisfy Condition Equation (3) for comparison. As shown by FIG. 12, it is apparent that according to Examples 8, 9, even the peripheral portion of the observed region can be illuminated more brightly than Comparative Examples 14, 15.

Example 10

FIG. 13 shows a graph of a luminous intensity distribution of Example 10.

Example 10 is provided with the gradient index lens 2 of the refractive index distribution n (r) in which the constant coefficient is set to A=0.5 (mm$^{-1}$), the refractive index on the optical axis X is set to $N_0$=1.7 in Condition Equation (1). Further, the length is set to L=2.5 (mm), the effective radius is set to R=1.0 (mm).

Example 10 satisfies Condition Equations (2) and (3) as follows.

Example 10: $(AR)^2$=0.25, AL/$\pi$≈0.398

FIG. 13 also shows graphs of luminous intensity distributions of Comparative Examples 16 through 18 in which only values of the constant coefficient A differ from that of Example 10 and which do not satisfy. Condition Equation (3) for comparison. As shown by FIG. 13, it is apparent that according to Example 10, even the peripheral portion of the observed region can be illuminated more brightly than Comparative Examples 16 through 18.

Examples 11, 12

Figure 14:
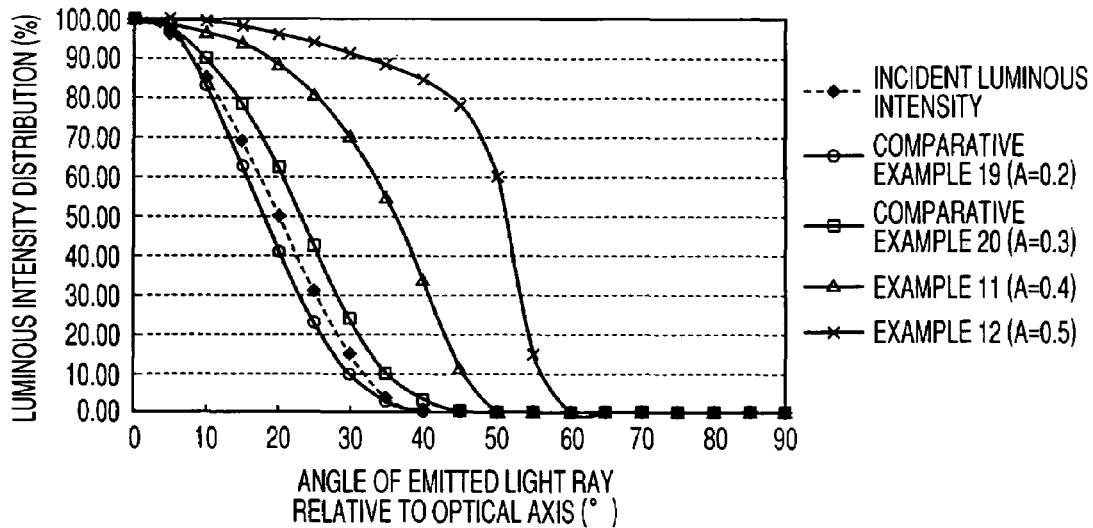
FIG. 14 is a graph showing luminous intensity distributions of Examples 11, 12, Comparative Examples 19, 20.

FIG. 14 shows graphs of luminous intensity distributions of Examples 11, 12.

Example 11 is provided with the gradient index lens 2 of the refractive index distribution n (r) in which the constant coefficient is set to A=0.4 (mm$^{-1}$), the refractive index on the optical axis X is set to $N_0$=1.7 in Condition Equation (1). Further, the length is set to L=3.0 (mm), the effective radius is set to R=1.0 (mm).

Further, Example 12 is set to be the same as Example 11 except that the constant coefficient is set to A=0.5 (mm$^{-1}$) in Condition Equation (1).

Examples 11, 12 satisfy all of Condition Equations (2) and (3) as follows.

Example 11: $(AR)^2$=0.16, AL/$\pi$≈0.382
Example 12: $(AR)^2$=0.25, AL/$\pi$≈0.478

FIG. 14 also shows graphs of luminous intensity distributions of Comparative Examples 19, 20 in which only values of the constant coefficient A differ from those of Examples 11, 12 and which do not satisfy Condition Equation (3) for comparison. As shown by FIG. 14, it is apparent that according to Examples 11, 12, even the peripheral portion of the observed region can be illuminated more brightly than Comparative Examples 19, 20.

Example 13

Figure 15:
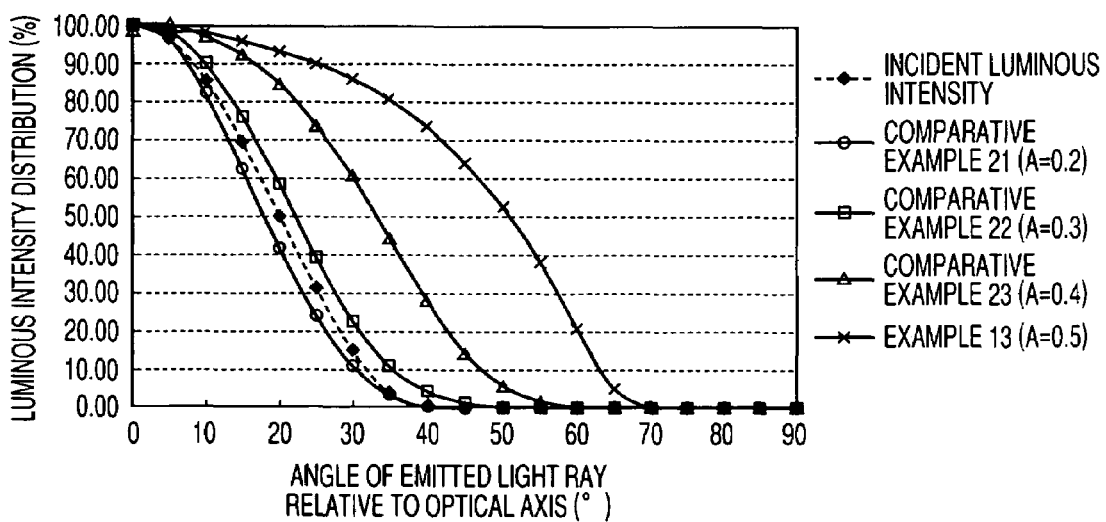
FIG. 15 is a graph showing luminous intensity distributions of Example 13, Comparative Examples 21 through 23.

FIG. 15 is a diagram showing a graph of a luminous intensity distribution of Example 13.

Example 13 is provided with the gradient index lens 2 of the refractive index distribution n (r) in which the constant coefficient is set to A=0.5 (mm$^{-1}$), the refractive index on the optical axis X is set to $N_0$=1.8 in Condition Equation (1). Further, the length is set to L=2.5 (mm), the effective radius is set to R=1.0 (mm).

Examples 13 satisfies Condition Equations (2) and (3) as follows.

Example 13: $(AR)^2$=0.25, AL/$\pi$≈0.398

FIG. 15 also shows graphs of luminous intensity distributions of Comparative Examples 21 through 23 in which only values of the constant coefficient A differ from that of Example 13 and which do not satisfy Condition Equation (3) for comparison. As shown by FIG. 15, it is apparent that according to Example 13, even the peripheral portion of the observed region can be illuminated more brightly than Comparative Examples 21 through 23.

Examples 14, 15

Figure 16:
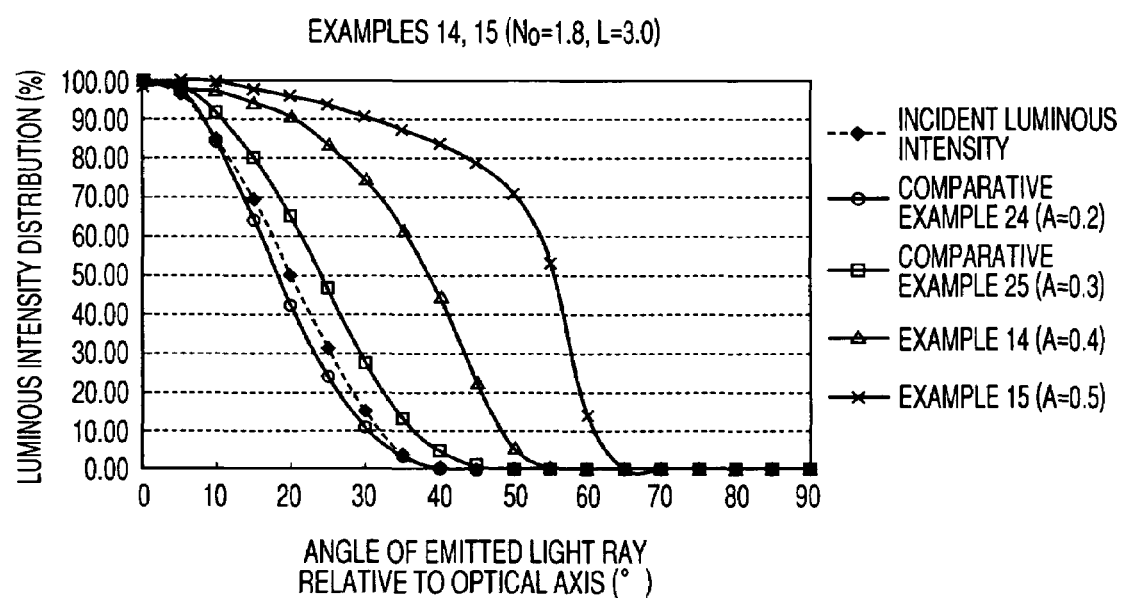
FIG. 16 is a graph showing luminous intensity distributions of Examples 14, 15, Comparative Examples 24 through 24.

FIG. 16 is a diagram showing graphs of luminous intensity distributions of Examples 14, 15.

Example 14 is provided with the gradient index lens 2 of the refractive index distribution n (r) in which the constant coefficient is set to A=0.4 (mm$^{-1}$), the refractive index on the optical axis X is set to $N_0$=1.8 in Condition Equation (1). Further, the length of the gradient index lens 2 is set to L=3.0 (mm), the effective radius is set to R=1.0 (mm).

Further, Example 15 is set to be the same as Example 14 except that the constant coefficient is set to A=0.5 (mm$^{-1}$) in Condition Equation (1).

Examples 14, 15 satisfy all of Condition Equations (2) and (3) as follows.

Example 14: $(AR)^2$=0.16, AL/$\pi$≈0.382
Example 15: $(AR)^2$=0.25, AL/$\pi$≈0.478

FIG. 16 also shows graphs of luminous intensity distributions of Comparative Examples 24, 25 in which only values of the constant coefficient A differ from those of Examples 14, 15 and which do not satisfy Condition Equation (3) for comparison. As shown by FIG. 16, it is apparent that according to Examples 14, 15, even the peripheral portion of the observed region can be illuminated more brightly than Comparative Examples 24, 25.

Further, although according to the above-described respective examples, the gradient index lens 2 corresponds to a case of k=0 in Condition Equation (3), the gradient index lens according to the invention is not limited to correspond to the case of k=0 in Condition Equation (3) but gradient index lenses respectively in correspondence with cases of arbitrary integers of k=1, 2, 3 . . . can be used.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-54645, filed Feb. 28 of 2005, the contents of which is incorporated herein by reference.

What is claimed is:

1. An illuminating optical system for an endoscope, comprising:

a light guide; and a gradient index lens having a refractive index distribution n(r) approximately expressed by Condition Equation (1), wherein the gradient index lens illuminates an observed region by light guided by the light guide, wherein the gradient index lens satisfies Condition Equations (2) and (3):

$$n(r) = N_0(1 - (A^2 r^2/2)) \quad (1)$$

$$(AR)^2 \leq 0.6 \quad (2)$$

$$0.5k + 0.35 \leq AL/\pi \leq 0.5k + 0.65 \quad (3)$$

wherein $N_0$ designates a refractive index on an optical axis of the gradient index lens; r designates a distance from the optical axis along a radial direction of the gradient index lens; R designates an effective radius of the gradient index lens; L designates a length of the gradient index lens in a direction of the optical axis; A designates a constant coefficient; and k designates a nonnegative integer.

2. The illuminating optical system according to claim 1, wherein the refractive index $N_0$ on the optical axis of said gradient index lens satisfies the relationship $1.5 \leq N_0 \leq 1.8$.

3. The illuminating optical system according to claim 1, wherein a light ray incident on said gradient index lens in parallel with the optical axis advances through said gradient index lens in a cosine curve having a period of $2\pi/A$.

4. The illuminating optical system according to claim 3, wherein the length L of said gradient index lens is set to a length proximate to an amount of ¼ of said period.

5. The illuminating optical system according to claim 1, wherein said gradient index lens satisfies the condition $0.36 \leq AL/\pi \leq 0.46$.

6. The illuminating optical system according to claim 1, wherein said gradient index lens satisfies the condition $0.35 \leq AL/\pi \leq 0.9$.

7. An illuminating optical system for an endoscope, comprising:

a light guide; and a gradient index lens having a refractive index distribution n(r) approximately expressed by Condition Equation (1), wherein said gradient index lens illuminates an observed region by light guided by said light guide, wherein said gradient index lens satisfies Condition Equations (2) and (3):

$$n(r) = N_0(1 - (A^2 r^2/2)) \quad (1)$$

$$0.5k + 0.35 \leq AL/\pi \leq 0.5k + 0.65 \quad (2)$$

$$0.5 \leq AL/\pi \quad (3)$$

wherein $N_0$ designates a refractive index on an optical axis of said gradient index lens; r designates a distance from the optical axis along a radial direction of said gradient index lens; L designates a length of said gradient index lens in a direction of the optical axis; A designates a constant coefficient; and k designates a nonnegative integer.

8. The illuminating optical system according to claim 7, wherein the refractive index $N_0$ on the optical axis of said gradient index lens satisfies the relationship $1.5 \leq N_0 \leq 1.8$.

9. The illuminating optical system according to claim 7, wherein a light ray incident on said gradient index lens in parallel with the optical axis advances through said gradient index lens in a cosine curve having a period of $2\pi/A$.

10. The illuminating optical system according to claim 7, wherein said gradient index lens satisfies the condition $(AR)^2 \leq 0.6$, where R designates an effective radius of said gradient index lens.

11. The illuminating optical system according to claim 7, wherein said gradient index lens satisfies the condition $0.5 \leq AL/\pi \leq 0.9$.

12. An illuminating optical system for an endoscope, comprising:

a light guide; and a gradient index lens having a refractive index distribution n(r) approximately expressed by Condition Equation (1), wherein said gradient index lens illuminates an observed region by light guided by said light guide, wherein said gradient index lens satisfies Condition Equations (2) and (3):

$$n(r) = N_0(1 - (A^2 r^2/2)) \quad (1)$$

$$(AR)^2 \leq 0.6 \quad (2)$$

$$0.35 \leq AL/\pi \leq 0.65 \quad (3)$$

wherein $N_0$ designates a refractive index on an optical axis of said gradient index lens; r designates a distance from the optical axis along a radial direction of said gradient index lens; R designates an effective radius of said gradient index lens; L designates a length of said gradient index lens in a direction of the optical axis; A designates a constant coefficient; and k designates a nonnegative integer.

13. The illuminating optical system according to claim 12, wherein the refractive index $N_0$ on the optical axis of said gradient index lens satisfies the relationship $1.5 \leq N_0 \leq 1.8$.

14. The illuminating optical system according to claim 12, wherein a light ray incident on said gradient index lens in parallel with the optical axis advances through said gradient index lens in a cosine curve having a period of $2\pi/A$.

15. The illuminating optical system according to claim 14, wherein the length L of said gradient index lens is set to a length proximate to an amount of ¼ of said period.

16. The illuminating optical system according to claim 12, wherein said gradient index lens satisfies the condition $0.36 \leq AL/\pi \leq 0.46$.

* * * * *